United States Patent
Zhu et al.

(10) Patent No.: US 10,877,858 B2
(45) Date of Patent: Dec. 29, 2020

(54) METHOD AND SYSTEM FOR A SPEED-UP CLUSTER RECONFIGURATION TIME VIA A GENERIC FAST SELF NODE DEATH DETECTION

(71) Applicant: ORACLE INTERNATIONAL CORPORATION, Redwood Shores, CA (US)

(72) Inventors: Ming Zhu, Redwood City, CA (US); Andrey Gusev, Dublin, CA (US)

(73) Assignee: Oracle International Corporation, Redwood Shores (CA)

( * ) Notice: Subject to any disclaimer, the term of this patent is extended or adjusted under 35 U.S.C. 154(b) by 147 days.

(21) Appl. No.: 16/165,314

(22) Filed: Oct. 19, 2018

(65) Prior Publication Data
US 2020/0125462 A1  Apr. 23, 2020

(51) Int. Cl.
G06F 11/20 (2006.01)

(52) U.S. Cl.
CPC ...... *G06F 11/2023* (2013.01); *G06F 11/2046* (2013.01); *G06F 2201/80* (2013.01); *G06F 2201/805* (2013.01)

(58) Field of Classification Search
CPC ............ G06F 11/2023; G06F 11/2043; G06F 11/2046; H04L 41/0631; H04L 41/0645; H04L 41/0659; H04L 41/0686; H04L 41/069; H04L 43/10; H04L 43/106
See application file for complete search history.

(56) References Cited

U.S. PATENT DOCUMENTS

| 6,728,897 | B1* | 4/2004 | Cramer | G06F 11/20 714/10 |
| 7,428,210 | B2* | 9/2008 | Saika | H04L 41/0663 370/217 |
| 9,021,296 | B1* | 4/2015 | Kiselev | G06F 16/21 714/6.23 |

OTHER PUBLICATIONS

Oracle Corp., "Linux OCFS2 Best Practices Guide", Feb. 2014, Oracle White Paper, pp. 1-27.
Bosilca, George et al. "Failure Detection and Propagation in HPC systems", SC 2016—The International Conference for High Performance Computing, Networking, Storage and Analysis, Nov. 2016, Salt Lake City, US, pp. 1-12.
Hayashibara, Naohiro et al. "The φ Accrual Failure Detector", May 10, 2004, School of Information Science, pp. 1-16.
Phan-Ba, Michael Duy-Nam, "A Literature of Failure Detection Within the Context of Solving the Problem of Distributed Consensus", Apr. 2015, The University of British Colombia, Vancouver, pp. 1-47.

(Continued)

*Primary Examiner* — Joseph R Kudirka
(74) *Attorney, Agent, or Firm* — Vista IP Law Group, LLP

(57) ABSTRACT

Described is a system, method, and computer program product for identifying communication failures between nodes of database cluster system where each member node within the cluster constantly monitors itself. Upon detection of a node communication failure by a particular node, the particular node notifies other member nodes of the cluster that the particular node is having communication problems with other nodes of the database cluster by communicating through a different communication channel with the other nodes so that the particular node may be evicted from the cluster efficiently.

33 Claims, 17 Drawing Sheets

(56) References Cited

OTHER PUBLICATIONS

Willsky, Alan S. "A Survey of Design Methods for Failure Detection in Dynamic Systems", 1976, Automatica, vol. 12, Pergamon Press, pp. 601-211.
Xiong, Naixue, et al. "A Self-tuning Failure Detection Scheme for Cloud Computing Service", 2012, IEEE 26$^{th}$ International Parallel and Distributed Processing Symposium, pp. 668-679.
Shokri, Eltefaat, et al. "An Approach for Adaptive Fault-Tolerance in Object-Oriented Open Distributed Systems", Feb. 1997, Workshop on Object-Oriented Reliable Distributed Systems, Newport Beach, CA, pp. 1-8.
Oracle Corp., "Oracle Real Application Clusters on Oracle WM Environments", Jan. 2017, Oracle White Paper, pp. 1-45.
Oracle Corp., "Understanding Oracle RAC Internals", Sep. 23, 2013, pp. 1-50.
Oracle Corp., "Oracle Database High Availability Best Practices", Aug. 2011, 11g Release 2, pp. 1-262.
Oracle Corp., "Oracle Clusterware Administration and Deployment Guide", Jul. 2017, Oracle Clusterware, 12c Release 1, pp. 1-662.
Womack, Jim, et al. "Clusterware Administration", Sep. 2014, Oracle Database Student Guide, 12c, pp. 1-406.

\* cited by examiner

METHOD AND SYSTEM FOR A SPEED-UP CLUSTER RECONFIGURATION TIME VIA A GENERIC FAST SELF NODE DEATH DETECTION

CROSS REFERENCE TO RELATED APPLICATIONS

The present application is related to U.S. application Ser. No. 16/165,997, filed on even date herewith, entitled "METHOD AND SYSTEM FOR A HIGH AVAILABILITY IP MONITORED BY BOTH OS/NETWORK AND DATABASE INSTANCES" which is hereby incorporated by reference in its entirety.

FIELD

This disclosure concerns a method, a computer program product, and a computer system for detecting communication breakdowns between nodes in a database cluster system.

BACKGROUND

A database clustering system allows the underlying servers within the computing infrastructure to communicate with each other so that they appear to function as a collective unit. Although the servers may be configured as standalone servers, each server has additional processes that communicate with other servers and where the different servers may access a shared/common set of database storage objects. The clustered database system therefore contains a shared architecture in which multiple running instances can each be used to manage a set of shared physical data files. Each of the database instances resides on a separate host and forms its own set of background processes and memory buffers, but in which the cluster infrastructure allows access to a single shared database via multiple database instances. In this way, the separate servers (e.g., nodes) appear as if they are one system to applications and end users.

In order for the database cluster to operate properly, these servers (e.g., nodes) will need to be able to communicate with one another in order to perform work. The database cluster as a whole cannot work properly if there is a breakdown of communications between the nodes. For example, many aspects of cluster interactions (e.g., lock management, cluster management, and status updates) cannot function properly if one or more nodes in the cluster are unable to communicate with the other nodes.

Conventional approaches to identify communication breakdowns between nodes in a cluster (e.g., network heartbeat processing) are driven by a first node that, when sending a communication to second node, does not receive a responsive communication or acknowledgement back from that second node. The conventional approach operates by having the first node start a timer when it sends the communication to the second node. If the first node does not receive the responsive communication/acknowledgement back within a timeout period, then the first node can make a determination that the second node has communication problems. After determining that the second node is having communication problems, the first node can initiate an eviction proceeding to evict the second node from the cluster. Other variants of the conventional approaches try to make the timeout period be more of a function of prior responses (e.g., Adaptive Failure Detectors) than a hard-configured value. Since eviction is a somewhat draconian and resource expensive process, the timeout period is set at a fairly lengthy period of time (e.g., 30 seconds) to ensure that nodes are not prematurely evicted from the cluster.

This conventional approach is problematic because, since the timeout period is set to a fairly lengthy period of time to avoid premature evictions, this means that the first node may need to undergo a lengthy wait time period before it can even confirm the existence of the problem, much less take actions to address the problem. Waiting for a timeout period to elapse is time wasted as far as database cluster components and their clients are concerned. A node that is inaccessible to the rest of the cluster will end up causing brownout by being unable to complete its requests. Clients connected to other nodes will be unable to complete their work because a lot of cluster compute workload is consensus based. The inability of the inaccessible node to partake in the consensus protocol until the node is determined to be unavailable and removed from the cluster will cause delay to the processing on the remaining cluster nodes. This could result in severe latencies and delay periods, where database operations are blocked at a given node for that entire period of time. The delay in processing the database operations could create significant real-world problems for the organization/enterprise that uses the database as a result of the latency.

Therefore, what is needed is an improvement approach to identify communication breakdowns between nodes of a database cluster system.

SUMMARY

According to some embodiments, a system, method, and computer program product is provided to identify communications breakdowns between nodes of a database cluster efficiently. In particular, instead of relying on another node in the database cluster to determine that a particular node within the cluster has communication problems after a timeout period expires (e.g., network heartbeat processing), the present disclosure provides an improved approach to quickly determine the particular node has communication problems by having each node self-identify to determine whether it has communication problems. By having each node determine whether it has communication problems with other nodes in the cluster (i.e., rather than rely on another node to make that determination via a network heartbeat process), the eviction process to remove any node that can no longer communicate with other nodes from the database cluster may begin almost instantaneously, as opposed to relying on another node within the database cluster to determine that the particular node has the communication problems after waiting for the timeout period to expire to begin the eviction process.

Further details of aspects, objects and advantages of the disclosure are described below in the detailed description, drawings and claims. Both the foregoing general description and the following detailed description are exemplary and explanatory, and are not intended to be limiting as to the scope of the disclosure.

BRIEF DESCRIPTION OF FIGURES

The drawings illustrate the design and utility of some embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope.

The drawings use like reference numerals to identify like elements. A letter after a reference numeral, such as "120a," indicates that the text refers specifically to the element having that particular reference numeral. A reference numeral in the text without a following letter, such as "120," refers to any or all of the elements in the drawings bearing that reference numeral (e.g. "120" in the text refers to reference numerals "120a" and/or "120b" in the drawings). The invention will be described and explained with additional specificity and detail through the use of the accompanying drawings in which.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

The present disclosure provides an improved system, computer program product and methods where each node within a database cluster constantly monitors itself to determine if it has any communication problems relative to any other node in the database cluster. Instead of requiring node 1 to figure out if node 2 has communication problems (e.g., network heartbeat process), thereby incurring a significant long timeout/latency period, since each node monitors itself to determine if it has any communication problems this means that node 1 will no longer need to incur the lengthy latency period to wait for a timeout period to expire to identify the communication problems. As a result, problems are identified much faster, and if identified early enough, evictions can be performed preemptively so that the potential problems are avoided before they occur.

Figure 1:
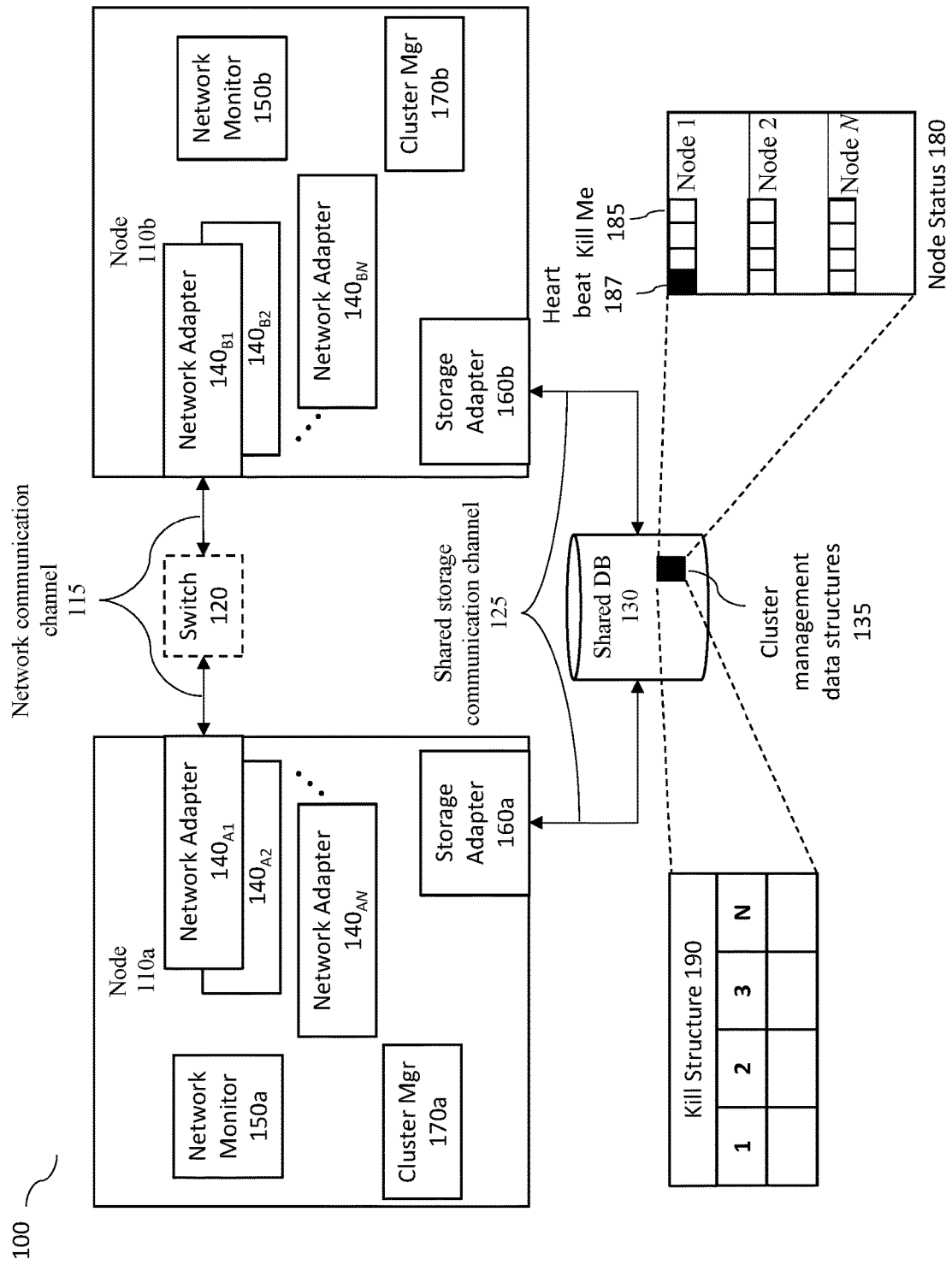
FIG. 1 illustrates an architecture for self-detecting communication failures between nodes of a database cluster, according to some embodiments of the present disclosure.

FIG. 1 illustrates an architecture for self-detecting communication failures between nodes of a database cluster, according to some embodiments of the present disclosure. System 100 illustrates a database cluster architecture for identifying communications breakdowns between nodes in a database cluster by having each member node in the database cluster self-identify/self-detect whether it has a communications failure by having each node monitor, as an example, its own local network adaptors providing network communications to and from other member nodes of the database cluster.

The database cluster 100 includes a plurality of nodes 110, network communication channels 115, shared storage communication channels 125, and shared database 130. A database cluster handles workload from one or more clients seeking to access a database through one or more application/web servers (not shown). The database cluster 100 includes multiple interconnected computers or servers (e.g., nodes 110) that appear as if they are one server to end users and applications that seek to access the shared database 130 via the plurality of nodes 110.

The servers within the database cluster 100 comprise any type of computing device that may be used to implement, operate, or interface with the database system. Examples of such devices include, for example, workstations, personal computers, mobile devices, servers, hosts, nodes, or remote computing terminals. A server that is part of a cluster, may be otherwise known as a cluster member, member node, and/or a node 110.

Each node 110 in the database cluster may include a plurality of network adapters 140, a plurality of storage adapters 160, a network monitor 150, and a cluster manager 170. The network adapter 140 (e.g., network interface cards (NICs)) is a circuit board or card that is installed in a computer so that the computer can be connected to a network. A network adapter 140 provides the computer with a dedicated, full-time connection to a network. Communications between the nodes of the database cluster are transmitted via the network adapters 140 on each respective node via network communication channels(s) 115.

Nodes 110 may include two different types of communication channels (e.g., network communication channel(s) 115 and shared storage communication channel(s) 125) to communicate with other member nodes of the cluster. Each node of the cluster may be interconnected to one another via network communication channel(s) 115 in order for the database cluster to operate properly. Each node within the cluster may be connected to the other member nodes in the cluster via network adapters 140 installed/configured within the respective nodes. The network communication channel(s) 115 may be implemented as a private network using a switch 120 (or multiple switches 120) such that only the nodes in the cluster can access for network communications. In some embodiments, network switch 120 may be included to manage one or more network communication channels 115 between a first set of network adapters 140 (e.g., network adapters $140_{A1}$-network adapters $140_{AN}$) from node 110a with a second set of network adapters 140 from node 110b (e.g., network adapters $140_{B1}$-network adapters $140_{BN}$). Note, node 110b may be referenced as node 2 in the present disclosure such that node 2, for example purposes made throughout the present disclosure, is the member node in the database cluster that self-identifies/self-detects itself as having communication problems with other member nodes in the database cluster while node 110a may be referenced as node 1 in the present disclosure as a member node in the database cluster that is operating perfectly fine such that node 1 does not have communication problems with other member nodes of the database cluster.

Network heartbeat processing is generally used to determine whether nodes in the database cluster have failed or are no longer available to the database cluster. For example, when a node within the database cluster fails because it has been powered down by accident or if it suddenly crashes before sending out any type of communication to notify other nodes that is failing, that particular node has failed and needs to be evicted from the cluster. Because the particular node was not able to communicate its health/status via the network communication channel 115, no other node in the database cluster may be aware of its failure. Network heartbeat processing resolves these types of issues. Normal operations for network heartbeat processing is for each node to send out a heartbeat signal to all other nodes in the cluster and to record the heartbeat responses received. When a first node detects that a second node has not responded to its heartbeat after a period of time (e.g., timeout period), the first node may begin the eviction process, but only after waiting the expiration of the timeout period.

In some embodiments, the network heartbeat processing resolves different types of node failures within the database cluster. However, in alternative embodiments, particularly for communication failures between nodes, the network heartbeat processing is not used to quickly determine communication failures. Instead, an improved approach, as disclosed in the present disclosure, provides an improved system, computer program product, and methods that reduce the amount of wait time before beginning an eviction of a node that has lost all network communications (e.g., network communication channel(s) 115) with other nodes of the cluster. The improved approach includes having each node monitor its own network communication channel(s) 115 and notifying the other member nodes of the cluster by updating a "kill me" field (discussed below) in the shard database 130. More detailed discussion of the improved approach is disclosed below.

The storage adapter 160 is a circuit board and/or integrated circuit adapter that provides input/output (I/O) processing and physical connectivity between a host system, or server, and a storage device. Examples of storage adapters 160 may include a host bus adapter (HBA), and/or a Fibre Channel (FC) adapter. HBAs are typically defined by interconnect technology, speed, port count and system interface. An FC adapter is a hardware component that provides connectivity from a server to a storage area network (SAN). An FC adapter, which uses the Peripheral Component Interconnect (PCI) slots on the server, can include one or more ports.

Communications between the nodes 110 of the database cluster and the shared database(s) 130 of the database cluster are transferred/transmitted over the configured shared storage communication channel(s) 125 via at least the storage adapter(s) 160 on respective member nodes of the database cluster. Data stored within the storage devices (e.g., shared database 130) are commonly accessible by any of the member nodes that make up the database cluster via shared storage communication channel 125. Shared storage communication channel 125 is a different type of communication channel than the network communication channel 115. Shared storage communication channel 125 connects the shared database 130 with respective nodes of the database cluster via respective storage adapter(s) 160 locally configured on each of the nodes 110.

Since each node of the database cluster has at least two types of communication channels (e.g., network and storage), each node may be able to communicate with other member nodes via the two types of communication channels such that if one of the communication channels completely fail on a particular node, the particular node may still be able to communicate the failure of the respective communication channel to other node members of the cluster using the other operating/working communication channel. For example, if all network communication channels for the database cluster fail because all network adapters on the particular node failed, the particular node may notify other node members of the cluster via the other still operating/working communication channel (e.g., shared storage communication channel 125) by writing to cluster management data structures 135 in the shared database 130 to indicate the particular node should be evicted since the particular node can no longer communicate with the other member nodes of the database cluster via the network communication channel 115.

Shared database 130 may include cluster management data structures 135 that store metadata about the status of member nodes in the database cluster. The cluster management data structures 135 may include a node status 180 data structure that includes metadata stored in different portions of the node status 180 data structure. Each node in the database cluster is associated to a portion of the node status 180 data structure such that only the node associated to the respective portions of the node status 180 may write to their respective portions of node status 180. The node status 180 data structure includes a field that is created for each node in the database cluster, where the field, if marked appropriately, indicates that the node associated to that field is to be evicted. For purposes of reference throughout the present disclosure, that field will be referred to herein as the "kill me" field. The "kill me" field associated to a particular node can be modified only by that particular node such that other nodes in the database cluster cannot modify a "kill me" field of another node.

Each node writes their respective node status into their portion of the node status 180 data structure on a periodic basis as a result of a heartbeat process. All nodes in a database cluster, on a very frequent basis, performs the heartbeat process for both the network communication channel and the shared storage communication channel. For the network communication channel, the network heartbeat process, as disclosed above, is the process (e.g., the conventional approach) for determining node failures and node health in a database cluster. For the shared storage communication channel(s) 125, each node (a) writes a timestamp into its own block within the shared storage metadata to notify other node members that it is still alive and well, and (b) scans a "kill me" field corresponding to all other member nodes in the cluster to see if any member nodes have indicated that they should be evicted from the database cluster.

For example, active member nodes in the cluster may write a timestamp to a timestamp field within their respective portions of node status 180 to let other member nodes know that they are still node members of the database cluster at the particular timestamp. Additionally, node status 180 may also include, as an example, a "kill me" field where a particular node in the cluster may write/update a value to indicate to the other member nodes of the database cluster that it needs to be removed from the database cluster. The particular node may self-identify/self-recognize that it has communication problems with other nodes in the database cluster when the particular node has determined that, for example, all of its network adapter(s) providing the network communication channel(s) 115 have failed. Since all network communication channel(s) 115 have failed for the particular node, one other way to notify the other member nodes of the cluster may be achieved by the particular node writing/updating its status (e.g., "kill me") into its respective portion of the node status 180 data structure in the shared database 130.

Other member nodes of the cluster, during heartbeat processing, may read all portions of the node status 180 data structure as they each update their respective portions of the node status 180 data structure with their current status. This way, as nodes are writing their node status into their respective portions of node status 180, they may also scan other portions of node status 180 associated to other member nodes within the database cluster to determine if any of the other member nodes have updated their respective "kill me" field to indicate that they have lost all network communications with other member nodes in the cluster. This way, as part of the periodic heartbeat process of the shared storage communication channel, each node may inspect other portions of node status 180 pertaining to other member nodes within the database cluster to see if any other member nodes have self-identified themselves as nodes to be evicted.

Cluster management data structures 135 may also include a kill structure 190 where other member nodes (e.g., a reconfiguration master node discussed below) of the database cluster may write to the kill structure 190 to indicate when a particular node having communication problems (e.g., node 110*b*) is ready to be removed from the database cluster. The kill structure 190 may be a structure having a plurality of fields where each field corresponds to separate nodes such that if a particular field is written to in a particular way, indicates that the node corresponding to the particular field is ready to be removed from the database cluster.

Network monitor 150 is configured on each node to recognize an interruption in the network adapters 140 configured on respective nodes. Network monitor 150 provides an event notification once all configured networks (e.g., network communication channel(s) 115) are determined to be broken. The network monitors 150 may establish a dedicated thread to listen on a raw socket of a specified network adapter in an operating system specific (OS) promiscuous mode to retrieve certain types of information used to determine a status of the network adapter. The network monitor, in at least one mode, may poll the network adapter, and in another mode, the network monitor may receive information pushed from the network adapter.

The network monitor 150 monitors all network adapters configured for network interfaces (e.g., network communication channel(s) 115) on respective nodes 110. The network monitor 150 may raise an event when all network adapters configured on a particular node providing the network communication channel(s) 115 are determined to have failed such that the particular node (e.g., node 110*b*) cannot communicate with other member nodes in the database cluster via the network communication channel(s) 115. In some embodiments, when a subset of the network adapters for a node has failed, the network monitor may failover communications originally sent through the subset of failed network adapters to another subset of network adapters that are still in operation on the node. However, when all network adapters are determined to be down, the network monitor 150 may raise an event to the cluster manager 170 with, as an example, an event type that all network adapters are down.

Cluster managers 170 are configured on each node 110. Cluster manager 170 is configured to manage the functionalities of the database cluster for the respective nodes in the database cluster. Cluster managers 170 provide the infrastructure necessary to run the database cluster. Cluster managers 170 also manages resources, such as virtual IP (VIP) addresses, databases, listeners, services, and so on. The cluster manager 170*b*, as an example, may receive a notification/event from the network monitor 150*b* that all network adapters 140*b* have failed on node 110*b*. The cluster manager 170 may also manage the cluster configuration by controlling which nodes are members of the cluster and by notifying members when a node joins or leaves the cluster.

The cluster manager 170*b* may have its own set of rules for handling certain notifications/events that occur. One event may be a notification from the network monitor that all network adapters 140*b* in node 110*b* are down. One particular rule corresponding to the notification may include instructions for notifying the other member nodes of the database cluster that node 110*b* has lost all network communications with other member nodes of the database cluster. The cluster manager 170*b* may then write to, as an example, the "kill me" field 185 of the portion of the node status 180 data structure corresponding to node 110*b* that node 110*b* needs to be removed from the cluster.

Additionally, cluster manager 170 on each member node of a database cluster may be configured to provide heartbeat processing of the shared storage communication channel(s) 125 on a frequent basis by writing into node status 180 data structure to record node status information/heartbeat information 187 into their respective portions of the node status 180 data structure. An additional step to the heartbeat processing for each member node may also include a scan of the node status 180 data structure to determine if any member nodes with the database cluster have written into their respective "kill me" fields to notify other member nodes of the cluster that should be evicted. Furthermore, in some embodiments, the cluster manager 170 may provide many high availability application programming interfaces (APIs) that can be used to manage applications or processes that run in a database cluster.

Figure 2:
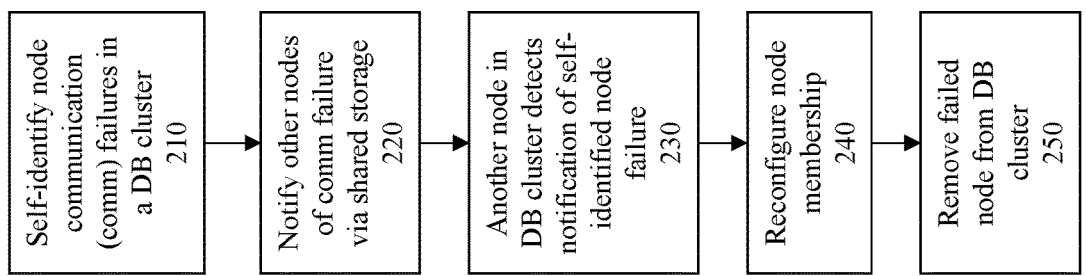
FIG. 2 illustrates a flowchart of an approach to implement some embodiments of the present disclosure.

FIG. 2 illustrates a flowchart of an approach to implement some embodiments of the present disclosure. FIGS. 2-6 are discussed below with references to elements of FIG. 1. At 210, a particular node within the database cluster may self-identify that it has communication problems/failures. For example, the network monitor 150*b* may have detected that all network adapters (e.g., network adapters 140$_{B1}$- network adapters 140$_{BN}$) have failed. Since all network adapters on node 2 (e.g., node 110*b*) providing the network communication channel(s) 115 have failed, node 2 is no longer connected to the other member nodes of the database cluster via the network communication channel(s) 115. Since node 2 cannot communicate with the other member nodes of the cluster, under the legacy approaches, other member node(s) of the cluster must detect the communication failure and wait for a timeout period to expire before beginning a reconfiguration/eviction process.

Since node 2 cannot communicate with the other member nodes of the cluster via the network communication channel (s) 115, node 2 may notify the other member nodes of its network communication failure via the shared storage (e.g., shared database 130) at step 220. This is possible because since the shared storage is interfaced with node 2 via a different communication interface (e.g., storage adapter(s) 160b) on node 2. Node 2 may still be able to communicate with the other member nodes of the database cluster via the shared storage by updating its "kill me" field in the node status 180 data structure to indicate that node 2 has communication problems and should be evicted. The "kill me" field may be a field in a database table corresponding to node 2 that includes a status value. In some embodiments, the "kill me" field may be a bit having either a value of "0" or "1", where a value of "0" may indicate that the "kill me" flag is "off" and a value of "1" may indicate that the "kill me" flag is "on", indicating that node 2 should be evicted, or vice-versa. One skilled in the art may appreciate other ways of providing the "kill me" indicator in a node status 180 data structure.

At step 230, another member node in the database cluster detects the updated "kill me" field corresponding to node 2. The other member node(s) in the database cluster, as part of updating their respective node status information into their respective portions of node status 180, may also query and/or view node status 180 to determine if any other member node(s) within the database cluster may have updated their "kill me" field. As discussed above, since all member nodes of the database cluster are continuously updating their node status into the node status 180 data structure on a frequent period (e.g., every 1 second), the ability for another node to detect the "kill me" field of node 2 may be detected relatively quickly (e.g., relative to the timeout period used in legacy approaches), depending on the next member node to perform its respective heartbeat process.

At 240, reconfiguration of the member nodes of the database cluster may begin once another member node has detected that node 2 has updated its "kill me" field. The reconfiguration process commences the eviction of node 2 from the database cluster. Reconfiguration of member nodes of the database cluster is a process that ensures there is consensus amongst all member nodes of the database cluster as to which nodes are member nodes of the database cluster at a particular point in time.

At 250, once the reconfiguration process is completed, node 2 will be instructed to remove itself from the database cluster since there is now a consensus amongst all member nodes of the database cluster that node 2 will be evicted from the database cluster. Node 2 will remove itself from the cluster once it receives instructions that it may remove itself from the cluster as a result of the reconfiguration process. The reconfiguration process is important because eviction of a node can only be determined and confirmed by remaining member nodes of the cluster, not by the node self-identifying itself a node that has communication problems. The reconfiguration process is important because, as an example, there must be consensus from all of the nodes in the cluster that node 2 is evicted so that at any point in time, every node in the membership of the cluster can provide a detailed list of which nodes are members in the cluster at a particular time, without discrepancies.

Figure 3:
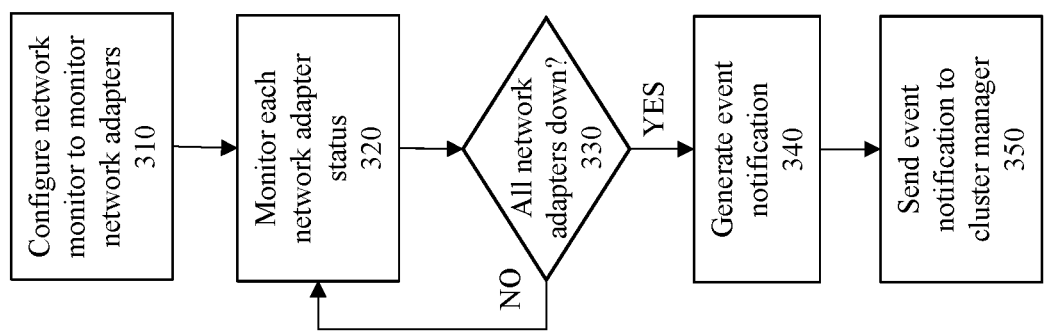
FIG. 3 illustrates a flowchart of an approach to self-detect communication failures between nodes of a database cluster, according to some embodiments of the present disclosure.

FIG. 3 illustrates a flowchart of an approach to self-detect communication failures between nodes of a database cluster, according to some embodiments of the present disclosure. At 310, a network monitor 150 may be configured to monitor network adapters of a respective node. Network monitor 150 may be configured to establish a dedicated thread to listen on a raw socket of a specified network interface in, for example, an OS promiscuous mode. The OS promiscuous mode is often used to monitor network activity. The OS promiscuous mode allows the network monitor to retrieve specific information regarding network activities of the network adapter. Promiscuous mode allows a network device to intercept and read each network packet that arrives in its entirety. This mode of operation is sometimes given to a network server that captures and saves all packets for analysis (for example, for monitoring network usage). In an Ethernet local area network (LAN), promiscuous mode is a mode of operation of a network adapter in which every data packet transmitted can be received and read by the network adapter. Promiscuous mode must be supported by each network adapter as well as by the input/output driver in the host operating system. Promiscuous mode is often used to monitor network activity. In some embodiments, multiple threads may be established to listen to multiple raw sockets of multiple network adapters configured on the node.

At step 320, the network monitor 150, monitors each network adapter 140 configured on the node by listening on the raw socket of each network connection communication channel(s) 115 in promiscuous mode to determine if respective network adapter(s) have failed. In at least one embodiment, the network monitor may poll the network adapters to monitor the network activities, and in another mode, the network monitor may receive the network activities information from the network adapters.

At step 330, the network monitor 150 determines if all network adapters have failed. If all network adapters have not failed, then the network monitor 150 loops back to step 320 to continue to monitor the network activities of each network adapter. If the network monitor determines that all network adapters on a particular node have failed, then an event notification is generated at step 340. The network monitor generates an event notification to be sent to the cluster manager 170 (see step 350). The event notification may include an event type indicating that all network adapters have failed on the particular node. In some embodiments, all network adapters must fail at the same time before an event notification is generated and sent to the cluster manager 170.

Figure 4:
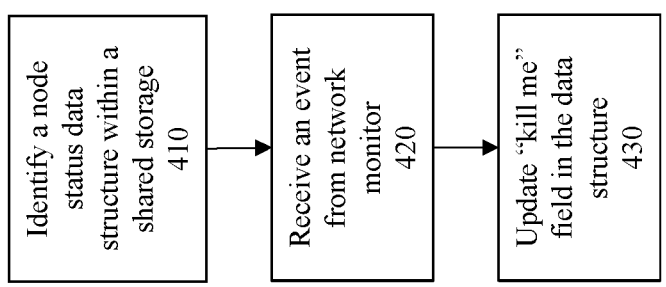
FIG. 4 illustrates a flowchart of an approach to notify other member nodes of a node having communication problems, according to some embodiments of the present disclosure.

FIG. 4 illustrates a flowchart of an approach to notify other member nodes of a node having communication problems, according to some embodiments of the present disclosure. At 410, a node status 180 data structure is identified by the cluster manager 170b. At 420, the cluster manager 170b receives an event notification sent from the network monitor, the event notification may include an event type indicating that all network adapters on the node 110b have failed. The event notification may be an electronic communication providing information detailing the event and information relevant for the cluster manager 170b to process the event. The cluster manager 170 may include a notification service that is a publish and subscribe service for communicating events quickly. The notification service provides rapid notification about state changes for database services, instances, the database themselves, and the nodes that form the cluster.

At 430, the cluster manager 170b may communicate with the shared database 130 via the storage adapter 160b and shared storage communication channel 125b to update a "kill me" field in the portion of the node status 180 data structure that corresponds to node 110b that lost all network communications to other member nodes of the database cluster. By updating the "kill me" field in the node status 180 data structure, node 110b is able to notify the other member nodes of the database cluster that node 110b has self-identified/self-detected itself to be evicted.

Figure 5:
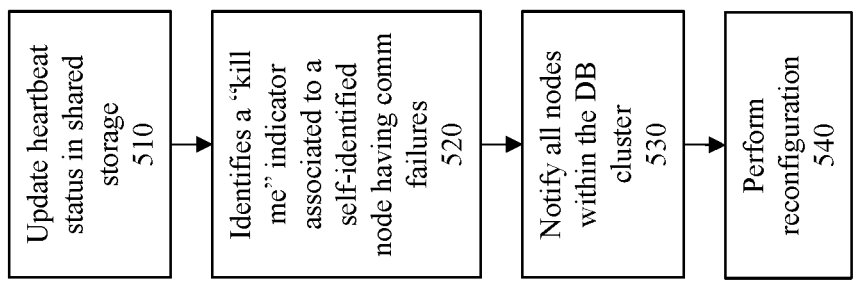
FIG. 5 illustrates a flowchart of an approach to detect a node having communication problems, according to some embodiments of the present disclosure.

FIG. 5 illustrates a flowchart of an approach to detect a node having communication problems, according to some embodiments of the present disclosure. At 510, a cluster manager 170a on an active node 110a in the database cluster may update heartbeat information into a portion of the node status 180 data structure that corresponds to the active node 110a. As a part of the heartbeat process for the shared storage communication channel, the cluster manager may also scan the "kill me" field corresponding to all other member nodes of the cluster to determine if any node may have updated their respective "kill me" field to indicate that their respective node(s) should be evicted from the database cluster.

At 520, the cluster manager 170a detects a "kill me" indicator associated to a self-identified node 110b having communication problems. At 530, the cluster manager 170a of the active member node 110a may notify all nodes within the database cluster of that node 110b self-identified itself as having communication problems. As discussed above, the time period between the time node 110b updated its respective portion of the node status 180 data structure to indicate that node 110b has communication problems and the time when an active node 110a first detects that node 110b has problems is significantly less than a timeout period that is predefined to determine that a particular node, as detected by another node of the cluster database, has communication problems before performing a reconfiguration process. At 540, a reconfirmation process is performed as a result of the notification sent to all nodes within the database cluster from step 530.

Figure 6:
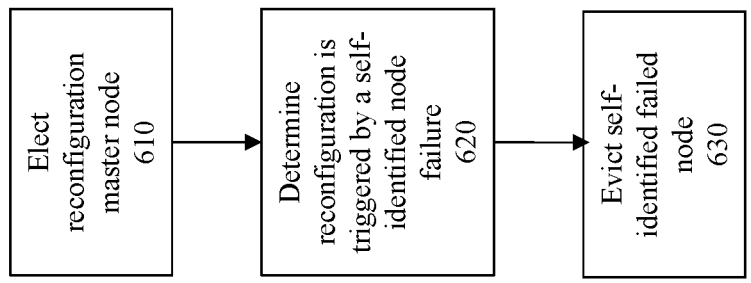
FIG. 6 illustrates an approach to reconfigure node members of a database cluster, according to some embodiments of the present disclosure.

FIG. 6 illustrates an approach to reconfigure node members of a database cluster, according to some embodiments of the present disclosure. Since there can be one or more member nodes in a cluster after a node is evicted from the database cluster, every member node remaining in the cluster must be aware of the reconfiguration process so that every member node remaining in the cluster is up to date on which member nodes are still in the cluster. When the member node that first notices that a particular node (e.g., node 110b) has self-identified itself as a candidate for eviction, the member node will broadcast to all other member nodes within the cluster that node 110b has identified itself as a node that has communication problems and should be evicted. At step 610, all of the member nodes must elect a reconfiguration master node to manage the reconfiguration of the members of the clusters. In some embodiments, the first node to detect a candidate node for eviction is elected as the reconfiguration master node to manage the reconfiguration. In other embodiments, election of the reconfiguration master node may be determined by, as an example, nodes within the database cluster with the lowest workload.

At step 620, the reconfiguration master node determines that the reconfiguration was triggered by a self-identified node communications failure event. Since the reconfiguration master node determined that the reconfiguration was triggered by a self-identified node communications failure event, the reconfiguration process may be optimized by the reconfiguration and simply recompile a members list of nodes still in the database cluster by removing the self-identified node from the list and sending the update list to the member nodes of the database cluster.

However, in alternative embodiments, the reconfiguration master may commence the standard reconfiguration process (i.e., as opposed to the optimized reconfiguration process discussed above). The standard reconfiguration process includes (a) request all member nodes of the database cluster to each provide an updated list of network heartbeat results of member nodes indicating which member nodes of the cluster each node can still communicate with; and (b) determine, from evaluation of the updated list of network heartbeat results received from each member node of the database cluster, which member nodes may still stay in the database cluster and which member node(s) must be evicted. This determination may be based on determining which member node(s) are still interconnected with all other member nodes within the database cluster. All other nodes that are no longer interconnected with the member nodes of the database cluster are evicted from the cluster.

At step 630, the reconfiguration master node may simply notify the self-identified node that it may remove itself from the database cluster by, as an example, writing to a data structure within the cluster management data structures 135. The data structure may be a kill structure 190 that may include a field or bit associated to the self-identified node to indicate that reconfiguration process is complete and that the self-identified node to remove itself from the database cluster. For example, the reconfiguration master node may simply write a value of "1" into a bit that is associated with the node to be evicted to indicate that the node to be evicted (e.g., node 110b) may now remove itself from the cluster. In some embodiments, the reconfiguration master may update a field associated with the node to be evicted with a value indicating that the node to be evicted may now remove itself from the cluster.

Node 110b may periodically check the kill structure 190 to determine if the reconfiguration master node has completed the reconfiguration process by indicating the respective field in the kill structure 190. Node 110b, via the cluster manager 170b, as part of its heartbeat processing, may frequently poll/retrieve from the kill structure 190 to determine if it has been instructed to be evicted from the database cluster. Once node 110b receives the instruction to remove itself from the database cluster, node 110b will remove itself from the database cluster. In some embodiments, removal of node 110b after receiving the instruction to be evicted from the database cluster may simply be a reboot of node 110b to restart all of the failed network adapters. In some embodiments, another node within the database cluster may evict/remove node 110b upon detecting that node 110b is marked to be evicted in kill structure 190.

Figure 7A:
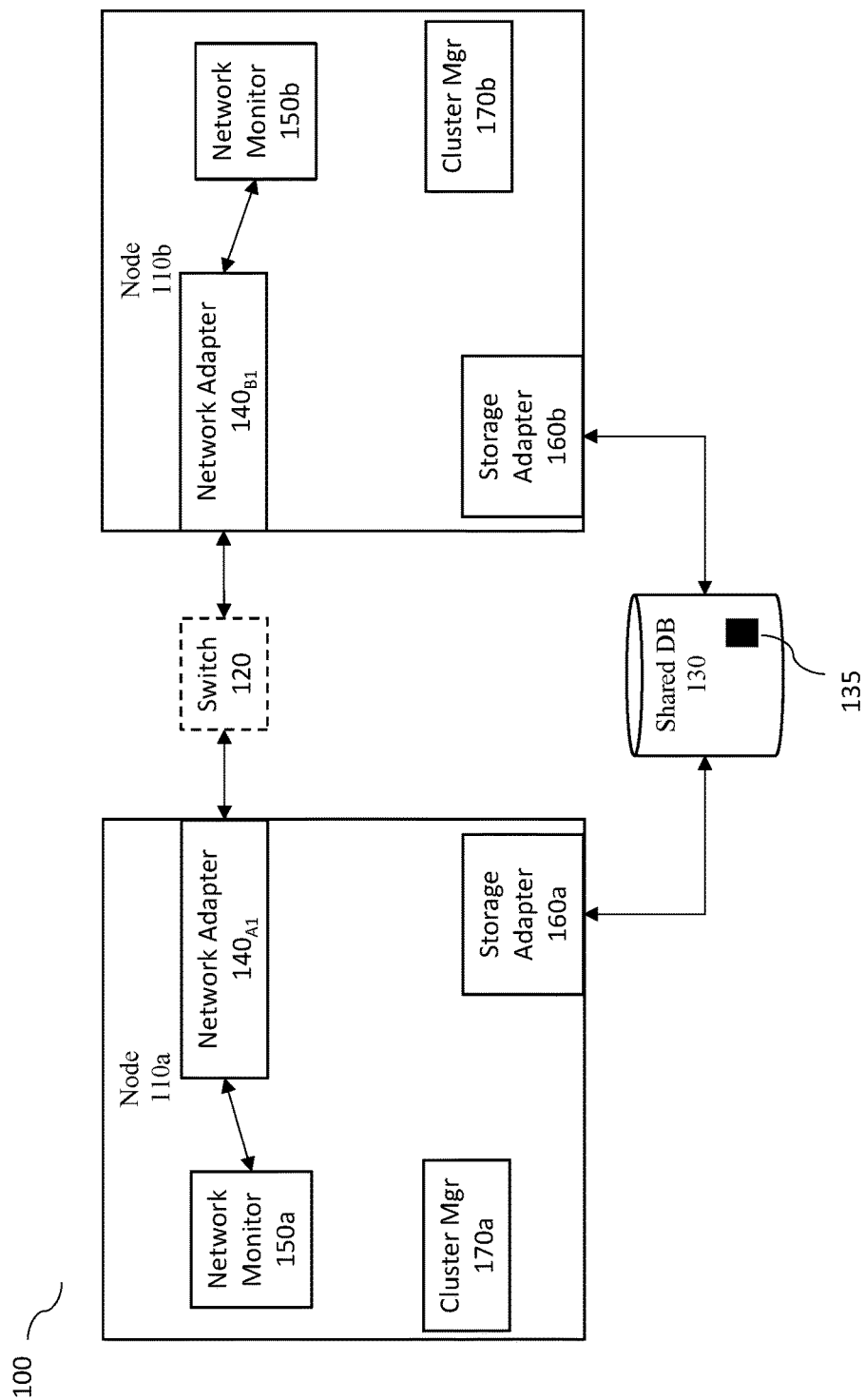
FIGS. 7A-7I illustrate an example of detecting and resolve nodes having communication problems, according to some embodiments of the present disclosure.

FIGS. 7A-7I illustrate an example of detecting and resolve nodes having communication problems, according to some embodiments of the present disclosure. FIG. 7A illustrates a two-node cluster where node 1 (e.g. node 110a) is an active node and node 2 (e.g., node 110b) is the node that has communication problems with other member nodes of the database cluster as a result of all of its network adapters being down. Note, FIG. 7A shows only a single network adapter 140 and a single storage adapter 160 being depicted within node 1 and node 2 for simplicity of explanation of the example. One of ordinary skill in the arts may appreciate that nodes of a database cluster may include one or more network adapters and one or more storage adapters.

Figure 7B:
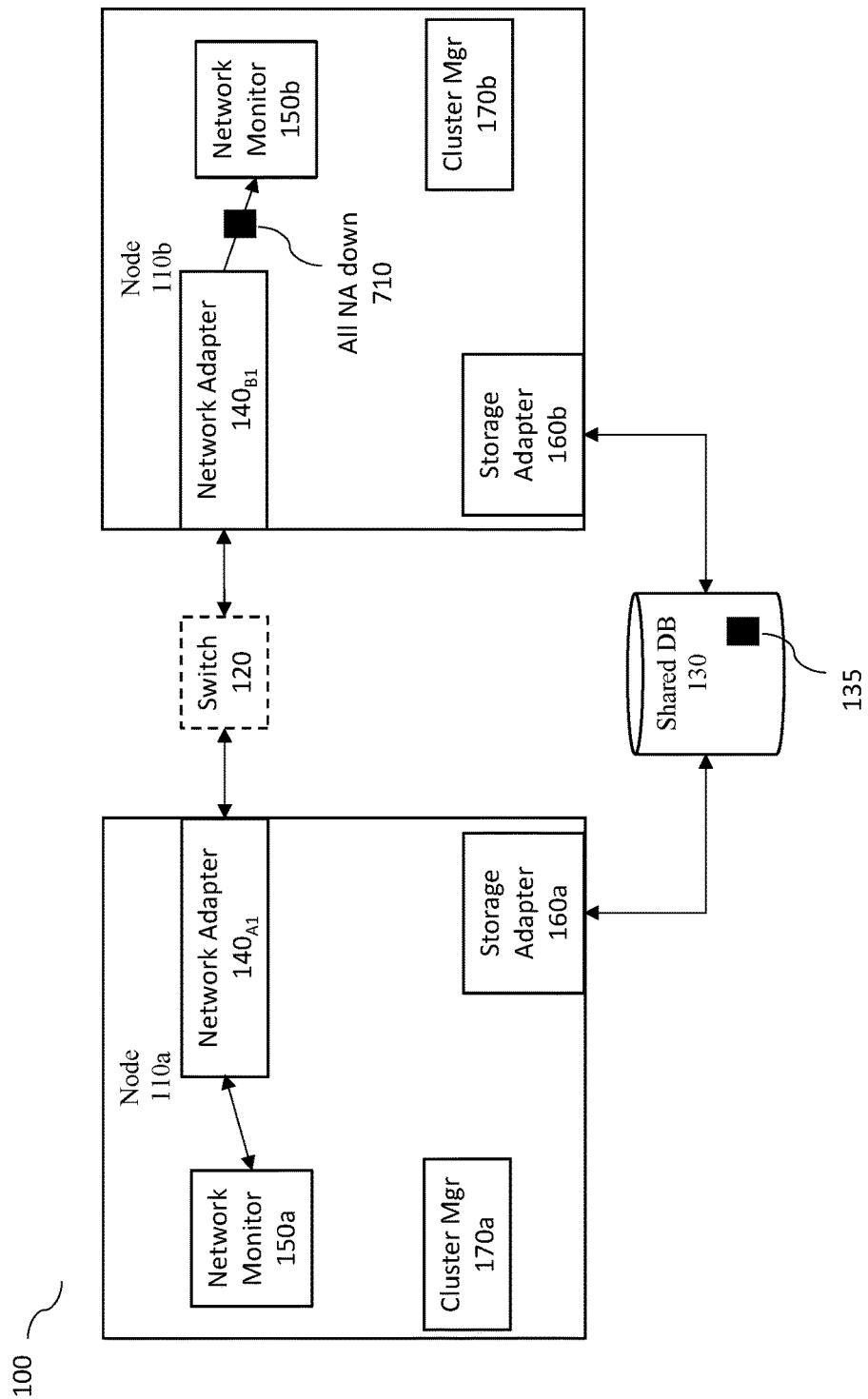

FIG. 7B illustrates that network adapter $140_{B1}$ has notified the network monitor 150b that all network adapters 140 have failed. As discussed above, in at least one mode, the network monitor 150b may poll the network adapter $140_{B1}$, and in another mode, the network monitor 150b may receive information from the network adapter 140$_{B1}$ of the status of the network adapter 140$_{B1}$.

Figure 7C:
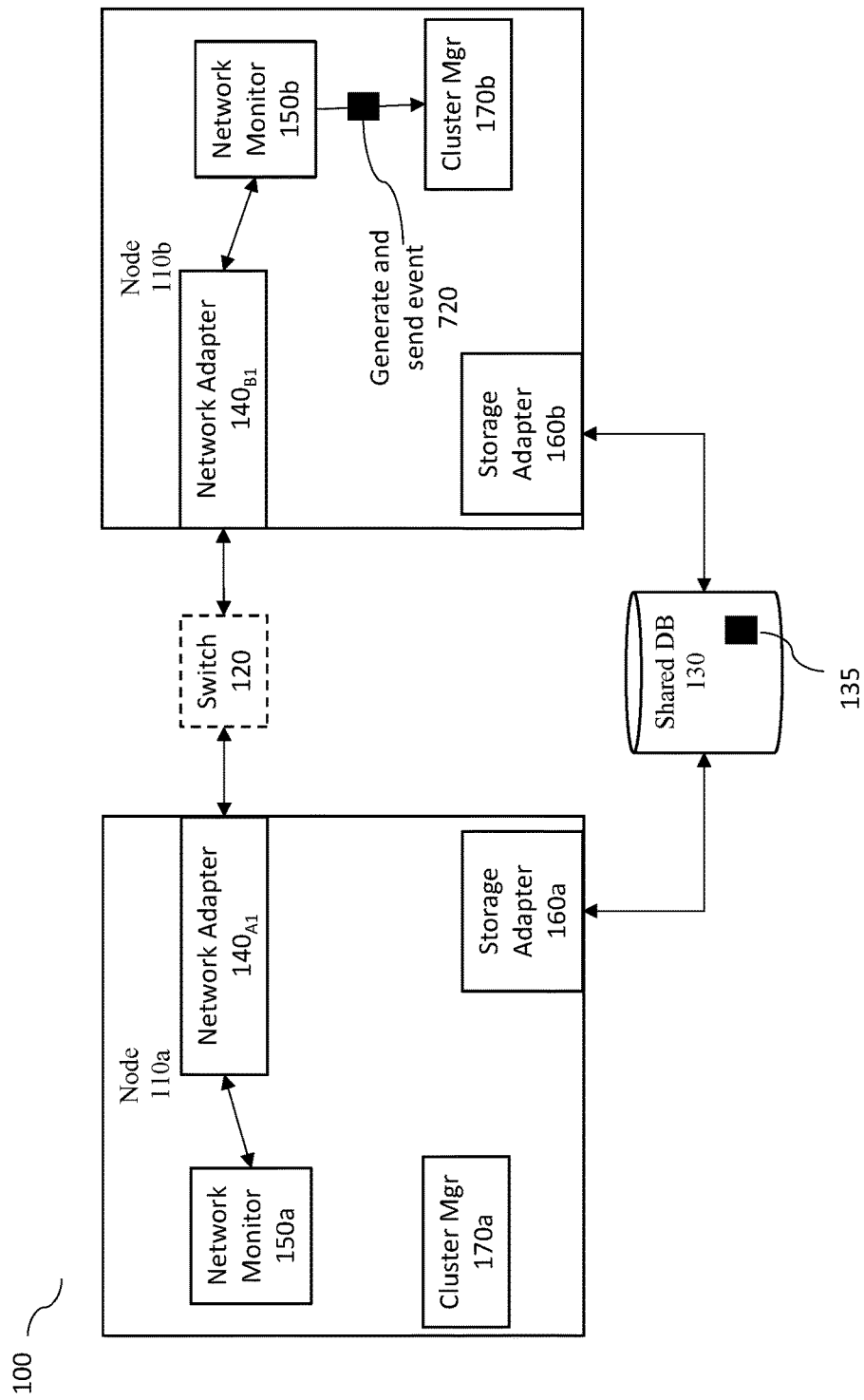
Figure 7D:
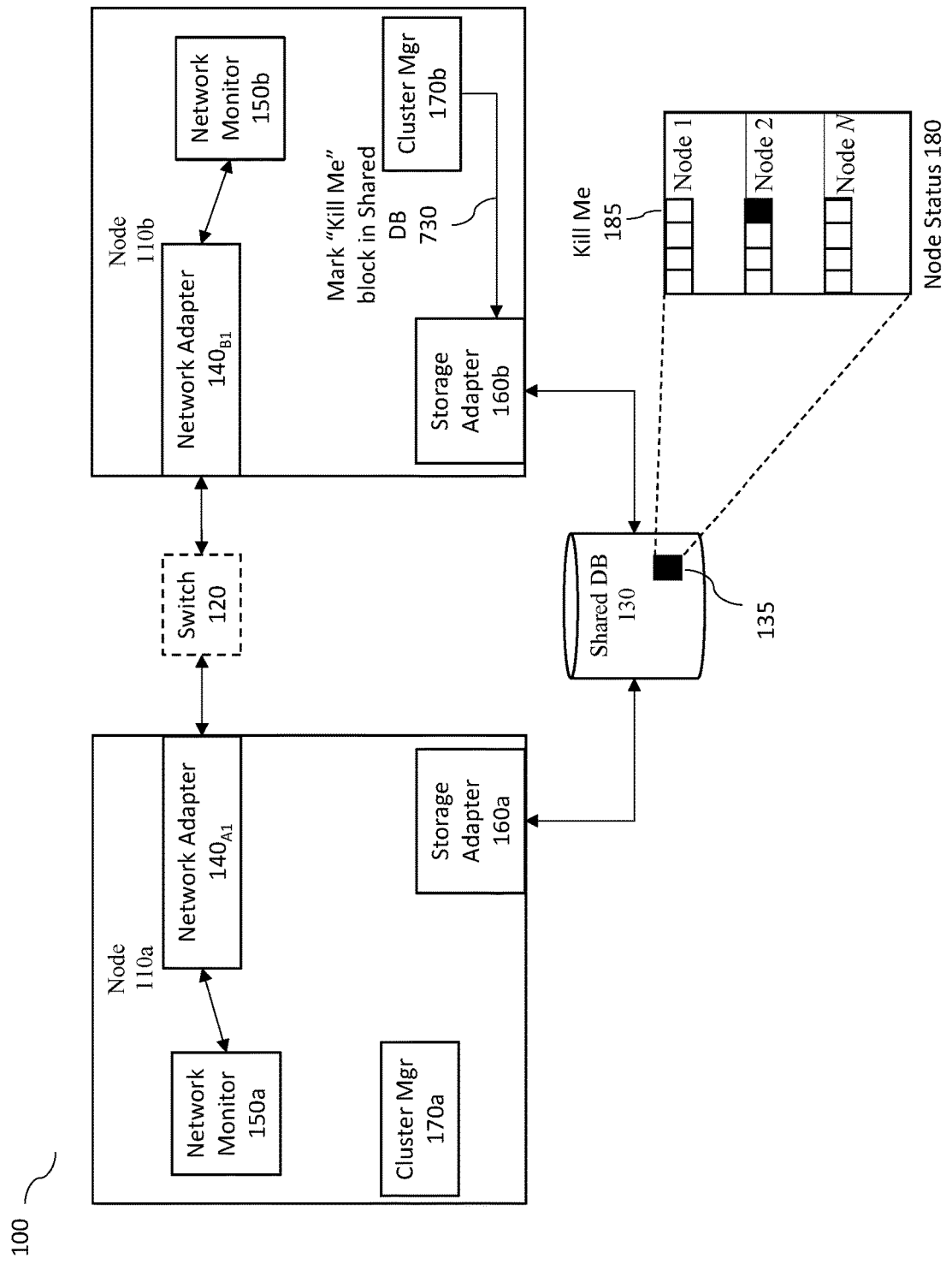

FIG. 7C illustrates the network monitor 150b generating and sending an event notification (e.g., an electronic communication) to the cluster manager 170b informing the cluster manager 170b that all network adapters 140 have failed on node 2. FIG. 7D illustrates that the cluster manager 170b may mark a bit on the node status 180 data structure corresponding to the "kill me" bit 185 corresponding to node 2 (see 730 and Node 2 within Node Status 180).

Figure 7E:
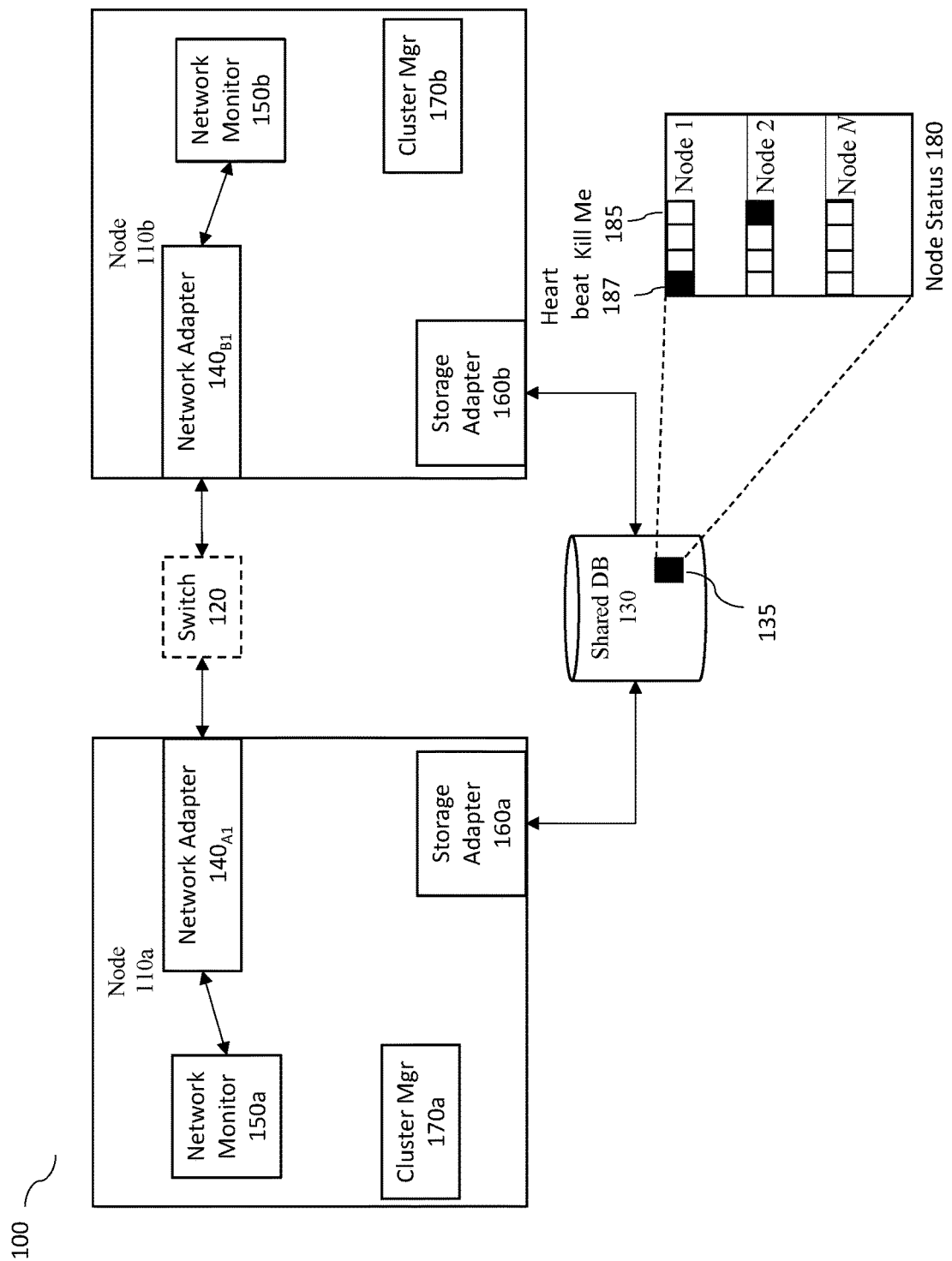
Figure 7F:
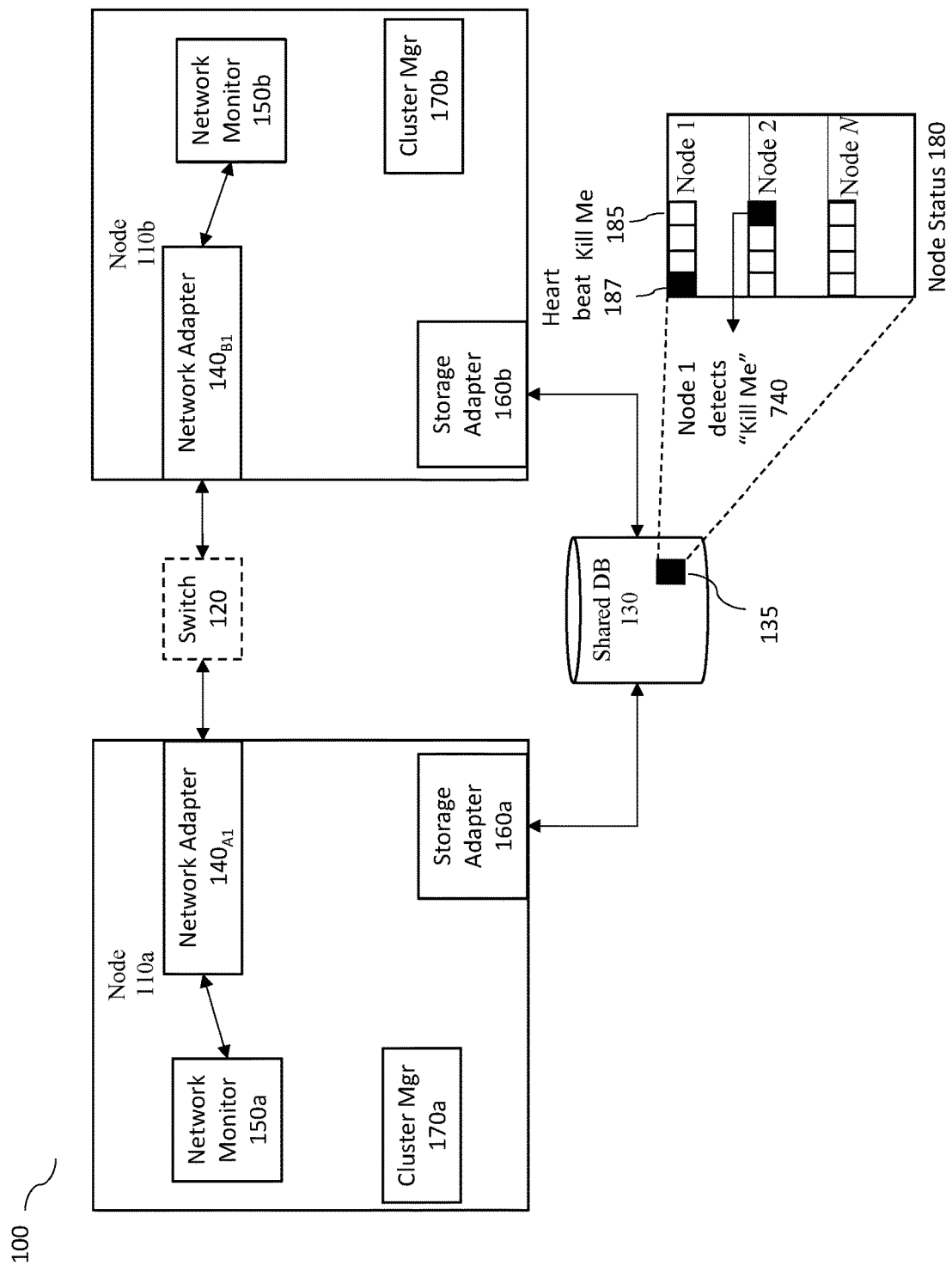
Figure 7G:
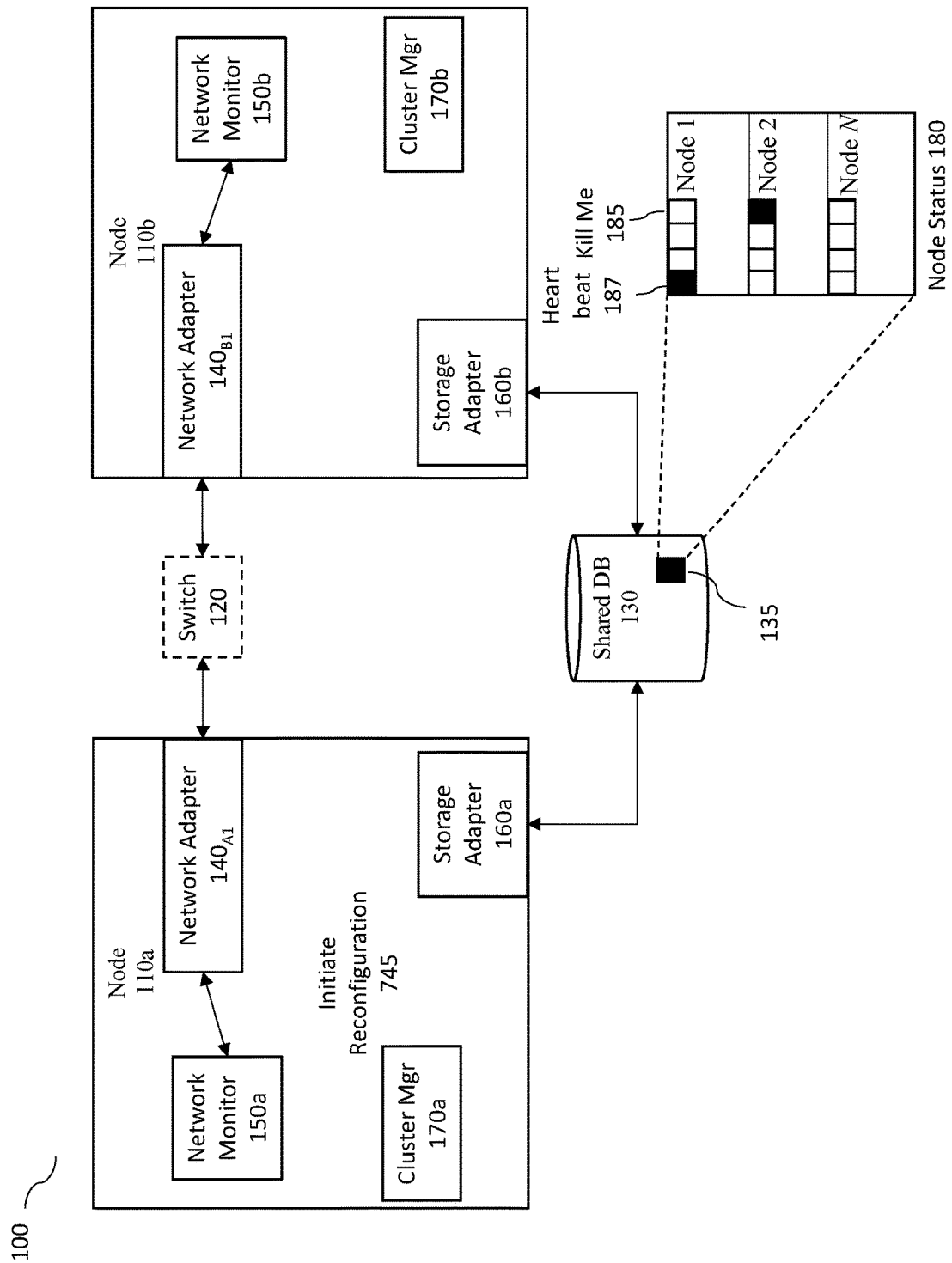

FIG. 7E illustrates node 1, during its heart beating processing for the shared storage communication channel, as depicted by an entry of the heartbeat 187 entry, also scans the other portions of the node status 180 data structure corresponding to the other member nodes of the cluster. FIG. 7F illustrates node 1 (e.g., at step 740) detects the "kill me" field corresponding to node 2 has been updated to indicate that node 2 has self-identified itself as a node having communication problems with other member nodes of the database cluster. FIG. 7G illustrates node 1 initiates the reconfiguration process (e.g., at step 745) to reconfigure the node membership information for all nodes in the database cluster.

Figure 7H:
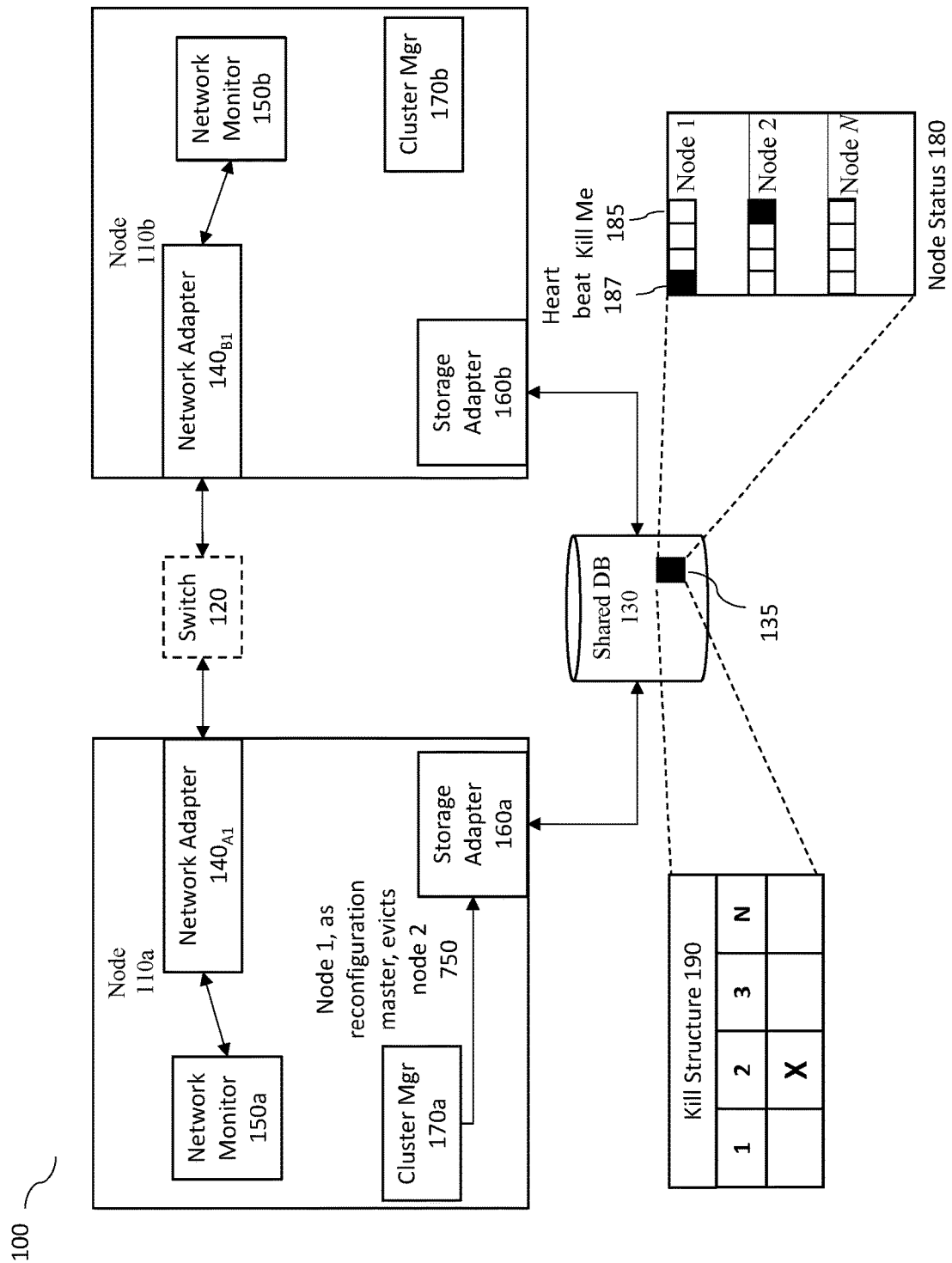

FIG. 7H illustrates that node 1, as the reconfiguration master node, evicts node 2 (see step 750). As discussed above, since the reconfiguration process was initiated by the identification that node 2 has self-identified itself as a candidate node for eviction, the reconfiguration process may simply update the master node membership information to not include node 2 in the node membership list for the database cluster. Additionally, to evict node 2, node 1 may provide instructions for node 2 to evict itself by indicating in kill structure 190 that node 2 may now be evicted from the database cluster by changing the bit associated to node 2 in the kill structure 190 for the database cluster.

Figure 7I:
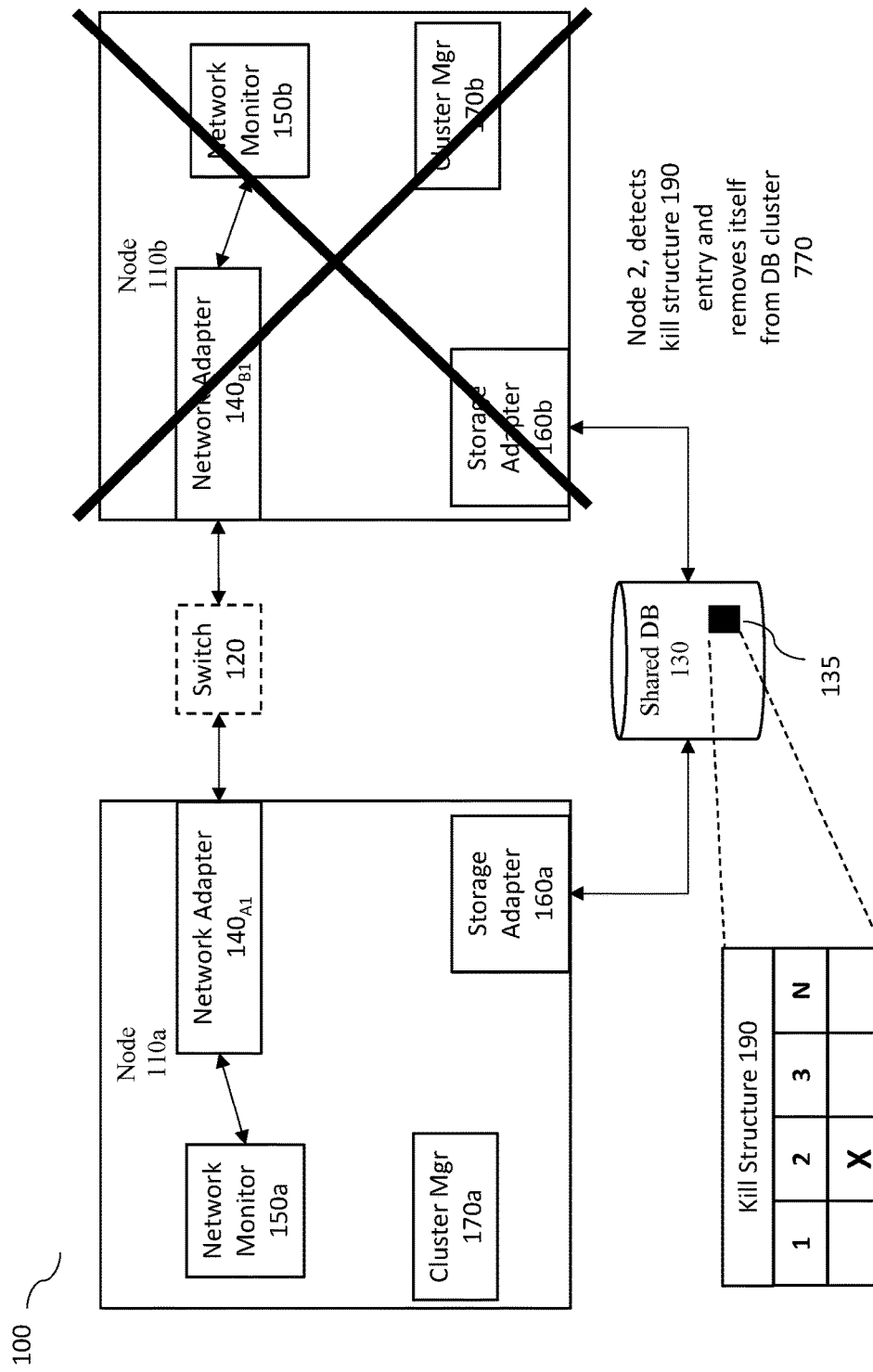

FIG. 7I illustrates that node 2 detects the kill structure 190 entry that the reconfiguration master node updated and begins the process to remove itself from the database cluster (see step 770). The cluster manager 170b on node 2 may poll the kill structure 190 on a periodic basis to determine if any node (e.g., node 1 being the reconfiguration master node) has indicated that node 2 is ready to be evicted/removed from the database cluster. In some embodiments, the cluster manager 170b may also poll the kill structure 190 as a result of a heartbeat process for the shared storage communication channel.

What has been disclosed is an approach for identifying communication failures between nodes of a database cluster efficiently. This approach therefore enhances efficiencies of the database cluster by providing systems, computer program products and methods for allowing each node to self-identify itself as a node having communication problems with other member nodes of the database cluster and to communicate this identification to other member nodes of the database cluster in a faster and more efficient wat. This approach greatly improves the computer system itself by reducing the amount of computer system processing involved in having to incur the significant latency period to wait for a predefined timeout period to expire before commencing eviction of the self-identified node having the communication problems.

System Architecture Overview

Figure 8:
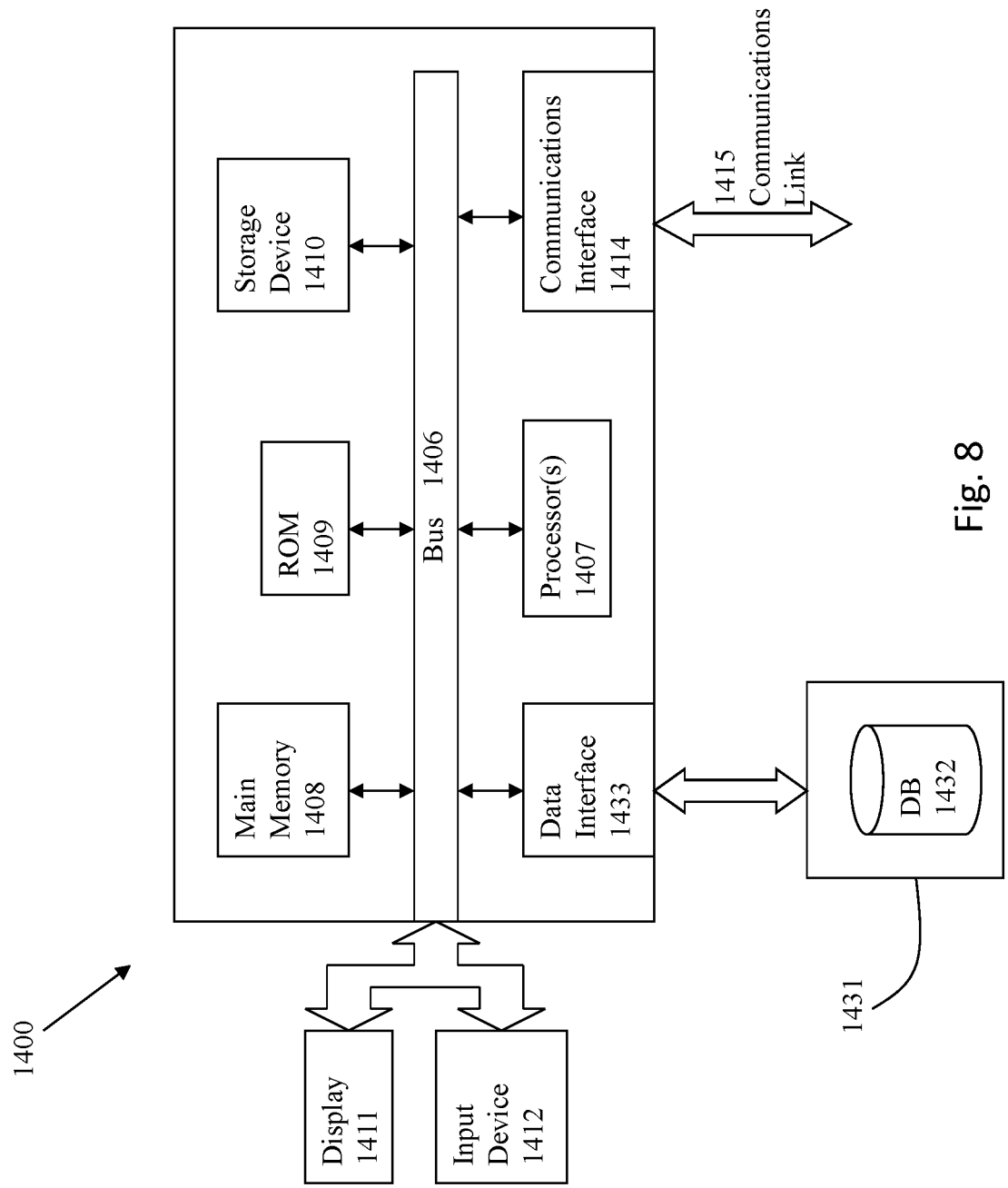
FIG. 8 is a block diagram of an illustrative computing system suitable for implementing an embodiment of the present disclosure.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 9:
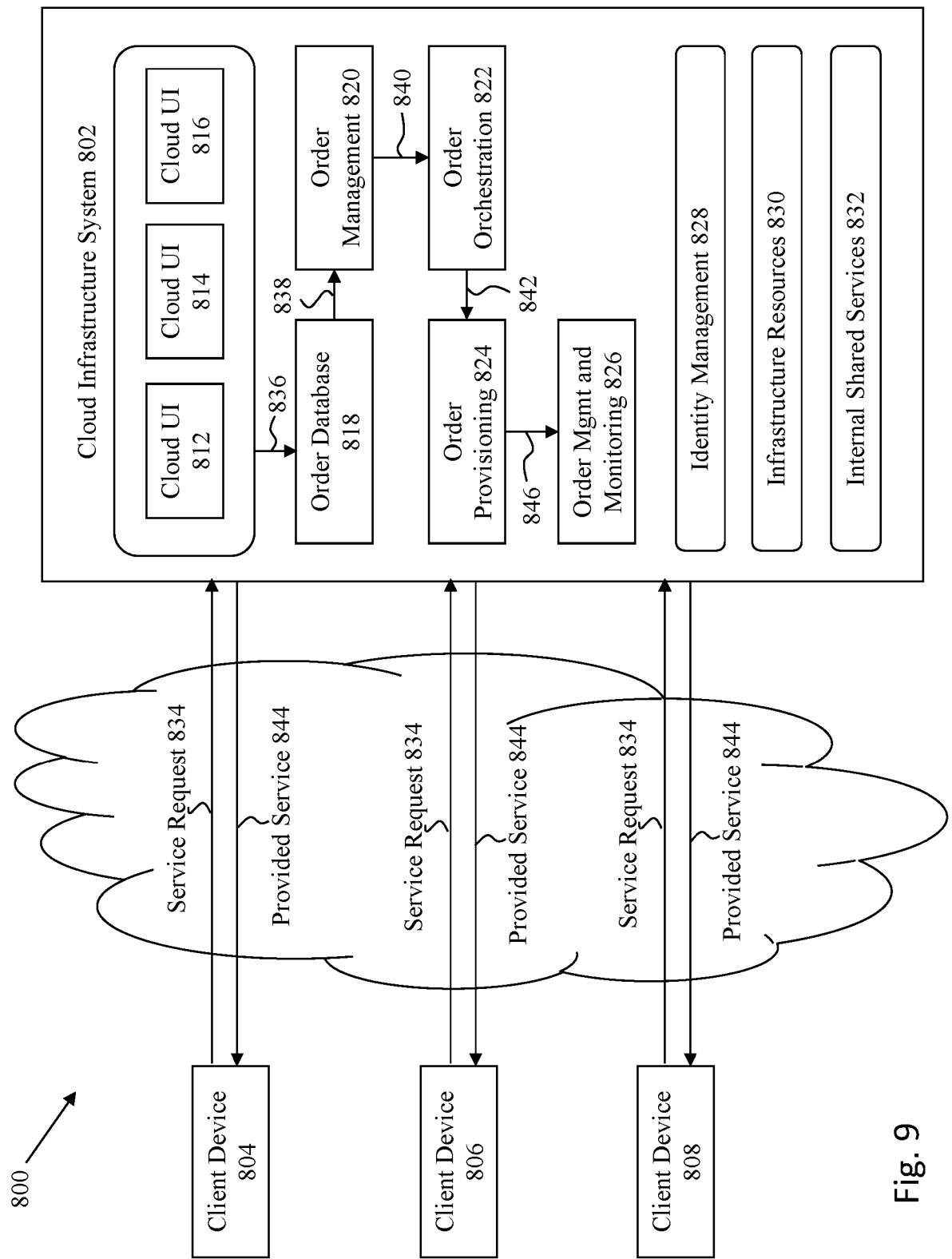
FIG. 9 is a block diagram of one or more components of a system environment by which services provided by one or more components of an embodiment system may be offered as cloud services, in accordance with an embodiment of the present disclosure.

FIG. 9 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 8. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A computer implemented method for identifying communication failures between nodes of a database cluster, the method comprising:
    self-identifying, by a first node in the database cluster, that the first node has communication problems;
    providing a notification to other nodes of the database cluster via an operating communication channel, wherein the notification is an update of a data structure in a shared storage of the database cluster indicating the communication problems of the first node;
    detecting, by a second node in the database cluster, the notification of the first node;
    initiating a reconfiguration of member nodes in the database cluster; and
    removing the first node from the database cluster upon receiving instructions from the reconfiguration.

2. The method of claim 1, wherein a network monitor is configured on a plurality of nodes in the database cluster to detect when all network adapters on respective nodes of the database cluster fail.

3. The method of claim 2, wherein the network monitor establishes a dedicated thread to listen on a raw socket of a network interface in promiscuous mode.

4. The method of claim 2, wherein the operating communication channel is a storage communication channel configured from a storage adapter locally configured on the respective nodes in the database cluster to a shared storage of the database cluster.

5. The method of claim 1, wherein the second node detects the notification by retrieving information from the data structure in the shared storage of the database cluster.

6. The method of claim 1, wherein the reconfiguration of member nodes provides the instruction to evict the first node from the database cluster.

7. A computer program product, embodied in a non-transitory computer readable medium, the non-transitory computer readable medium having stored thereon a sequence of instructions which, when stored in memory and executed by a processor causes the processor to execute a process for identifying communication failures between nodes of a database cluster, the process comprising:
    self-identifying, by a first node in the database cluster, that the first node has communication problems;
    providing a notification to other nodes of the database cluster via an operating communication channel, wherein the notification is an update of a data structure in a shared storage of the database cluster indicating the communication problems of the first node;
    detecting, by a second node in the database cluster, the notification of the first node;
    initiating a reconfiguration of member nodes in the database cluster; and
    removing the first node from the database cluster upon receiving instructions from the reconfiguration.

8. The computer program product of claim 7, wherein a network monitor is configured on a plurality of nodes in the database cluster to detect when all network adapters on respective nodes of the database cluster fail.

9. The computer program product of claim 8, wherein the network monitor establishes a dedicated thread to listen on a raw socket of a network interface in promiscuous mode.

10. The computer program product of claim 8, wherein the operating communication channel is a storage communication channel configured from a storage adapter locally configured on the respective nodes in the database cluster to a shared storage of the database cluster.

11. The computer program product of claim 7, wherein the second node detects the notification by retrieving information from the data structure in the shared storage of the database cluster.

12. The computer program product of claim 7, wherein the reconfiguration of member nodes provides the instruction to evict the first node from the database cluster.

13. A system, comprising:
    a processor; and
    a memory comprising computer code executed using the processor, in which the computer code implements a process for, identifying communication failures between nodes of a database cluster, the process comprising: self-identifying, by a first node in the database cluster, that the first node has communication problems, providing a notification to other nodes of the database cluster via an operating communication channel wherein the notification is an update of a data structure in a shared storage of the database cluster indicating the communication problems of the first node, detecting, by a second node in the database cluster, the notification of the first node, initiating a reconfiguration of member nodes in the database cluster, and removing the first node from the database cluster upon receiving instructions from the reconfiguration.

14. The system of claim 13, wherein a network monitor is configured on a plurality of nodes in the database cluster to detect when all network adapters on respective nodes of the database cluster fail.

15. The system of claim 14, wherein the network monitor establishes a dedicated thread to listen on a raw socket of a network interface in promiscuous mode.

16. The system of claim 14, wherein the operating communication channel is a storage communication channel configured from a storage adapter locally configured on the respective nodes in the database cluster to a shared storage of the database cluster.

17. The system of claim 13, wherein the second node detects the notification by retrieving information from the data structure in the shared storage of the database cluster.

18. The system of claim 13, wherein the reconfiguration of member nodes provides the instruction to evict the first node from the database cluster.

19. A computer implemented method for identifying communication failures between nodes of a database cluster, the method comprising:
   self-identifying, by a first node in the database cluster, that the first node has communication problems, wherein a network monitor is configured on a plurality of nodes in the database cluster to detect when all network adapters on respective nodes of the database cluster fail;
   providing a notification to other nodes of the database cluster via an operating communication channel;
   detecting, by a second node in the database cluster, the notification of the first node;
   initiating a reconfiguration of member nodes in the database cluster; and
   removing the first node from the database cluster upon receiving instructions from the reconfiguration.

20. The method of claim 19, wherein the network monitor establishes a dedicated thread to listen on a raw socket of a network interface in promiscuous mode.

21. The method of claim 19, wherein the operating communication channel is a storage communication channel configured from a storage adapter locally configured on the respective nodes in the database cluster to a shared storage of the database cluster.

22. The method of claim 19, wherein the notification is an update of a data structure in a shared storage of the database cluster indicating the communication problems of the first node.

23. The method of claim 19, wherein the notification is an update of a data structure in a shared storage of the database cluster indicating the communication problems of the first node and the second node detects the notification by retrieving information from the data structure in the shared storage of the database cluster.

24. A computer program product, embodied in a non-transitory computer readable medium, the non-transitory computer readable medium having stored thereon a sequence of instructions which, when stored in memory and executed by a processor causes the processor to execute a process for identifying communication failures between nodes of a database cluster, the process comprising:
   self-identifying, by a first node in the database cluster, that the first node has communication problems, wherein a network monitor is configured on a plurality of nodes in the database cluster to detect when all network adapters on respective nodes of the database cluster fail;
   providing a notification to other nodes of the database cluster via an operating communication channel;
   detecting, by a second node in the database cluster, the notification of the first node;
   initiating a reconfiguration of member nodes in the database cluster; and
   removing the first node from the database cluster upon receiving instructions from the reconfiguration.

25. The computer program product of claim 24, wherein the network monitor establishes a dedicated thread to listen on a raw socket of a network interface in promiscuous mode.

26. The computer program product of claim 24, wherein the operating communication channel is a storage communication channel configured from a storage adapter locally configured on the respective nodes in the database cluster to a shared storage of the database cluster.

27. The computer program product of claim 24, wherein the notification is an update of a data structure in a shared storage of the database cluster indicating the communication problems of the first node.

28. The computer program product of claim 24, wherein the notification is an update of a data structure in a shared storage of the database cluster indicating the communication problems of the first node and the second node detects the notification by retrieving information from the data structure in the shared storage of the database cluster.

29. A system, comprising:
   a processor; and
   a memory comprising computer code executed using the processor, in which the computer code implements a process for, identifying communication failures between nodes of a database cluster, the process comprising: self-identifying, by a first node in the database cluster, that the first node has communication problems, wherein a network monitor is configured on a plurality of nodes in the database cluster to detect when all network adapters on respective nodes of the database cluster fail, providing a notification to other nodes of the database cluster via an operating communication channel, detecting, by a second node in the database cluster, the notification of the first node, initiating a reconfiguration of member nodes in the database cluster, and removing the first node from the database cluster upon receiving instructions from the reconfiguration.

30. The system of claim 29, wherein the network monitor establishes a dedicated thread to listen on a raw socket of a network interface in promiscuous mode.

31. The system of claim 29, wherein the operating communication channel is a storage communication channel configured from a storage adapter locally configured on the respective nodes in the database cluster to a shared storage of the database cluster.

32. The system of claim 29, wherein the notification is an update of a data structure in a shared storage of the database cluster indicating the communication problems of the first node.

33. The system of claim 29, wherein the notification is an update of a data structure in a shared storage of the database cluster indicating the communication problems of the first node and the second node detects the notification by retrieving information from the data structure in the shared storage of the database cluster.

* * * * *